United States Patent [19]

Fail

[11] Patent Number: 4,712,198

[45] Date of Patent: Dec. 8, 1987

[54] PROCESS FOR OPTIMIZING THE FREQUENCY SPECTRUM OF PULSES EMITTED BY AN EMISSION DEVICE COMPRISING SEVERAL SEISMIC IMPLOSION FORCES

[75] Inventor: Jean-Pierre Fail, Royan, France

[73] Assignee: Institute Francais du Petrole, Rueil-Malmaison, France

[21] Appl. No.: 745,228

[22] Filed: Jun. 17, 1985

[30] Foreign Application Priority Data

Jun. 18, 1984 [FR] France .................................. 84 09621

[51] Int. Cl.[4] .............................................. G01V 1/38
[52] U.S. Cl. ...................................... 367/23; 367/146
[58] Field of Search ........................ 367/23, 24, 50, 51, 367/146, 55; 181/113, 118, 120, 402

[56] References Cited

U.S. PATENT DOCUMENTS 2,908,342  10/1959  Itria et al. ............................ 181/111

FOREIGN PATENT DOCUMENTS 2126343  3/1984  United Kingdom ................... 367/23
2148503  5/1985  United Kingdom ................ 367/146

OTHER PUBLICATIONS

Manin, M., "An Attempt to Control the Frequency Spectrum Transmitted During the Implosion Generated by a Steam Gun . . . ", Europe Communities Comm., New Tech. for Explor. and Exploit. of Oil and Gas Resources Symp. (Luxembourg, 4/18/79), Proc V1, pp. 3-11 (ISBN 0-86010-158-4).

*Primary Examiner*—Nelson Moskowitz
*Assistant Examiner*—Ian J. Lobo
*Attorney, Agent, or Firm*—Antonelli, Terry & Wands

[57] ABSTRACT

A process is provided for optimizing the frequency spectrum of pulses emitted by implosion sources by attenuating the tripping or precursor peak preceding the main peak due to the implosion.

A plurality of immersed sources are used at different depths and, by successive tripping of the sources in time defined sequence, all their implosion peaks are phased while attenuating to a very large extent the resultant of the different tripping peaks, which increases the acoustic power emitted and makes the frequency spectrum more homogeneous.

3 Claims, 7 Drawing Figures

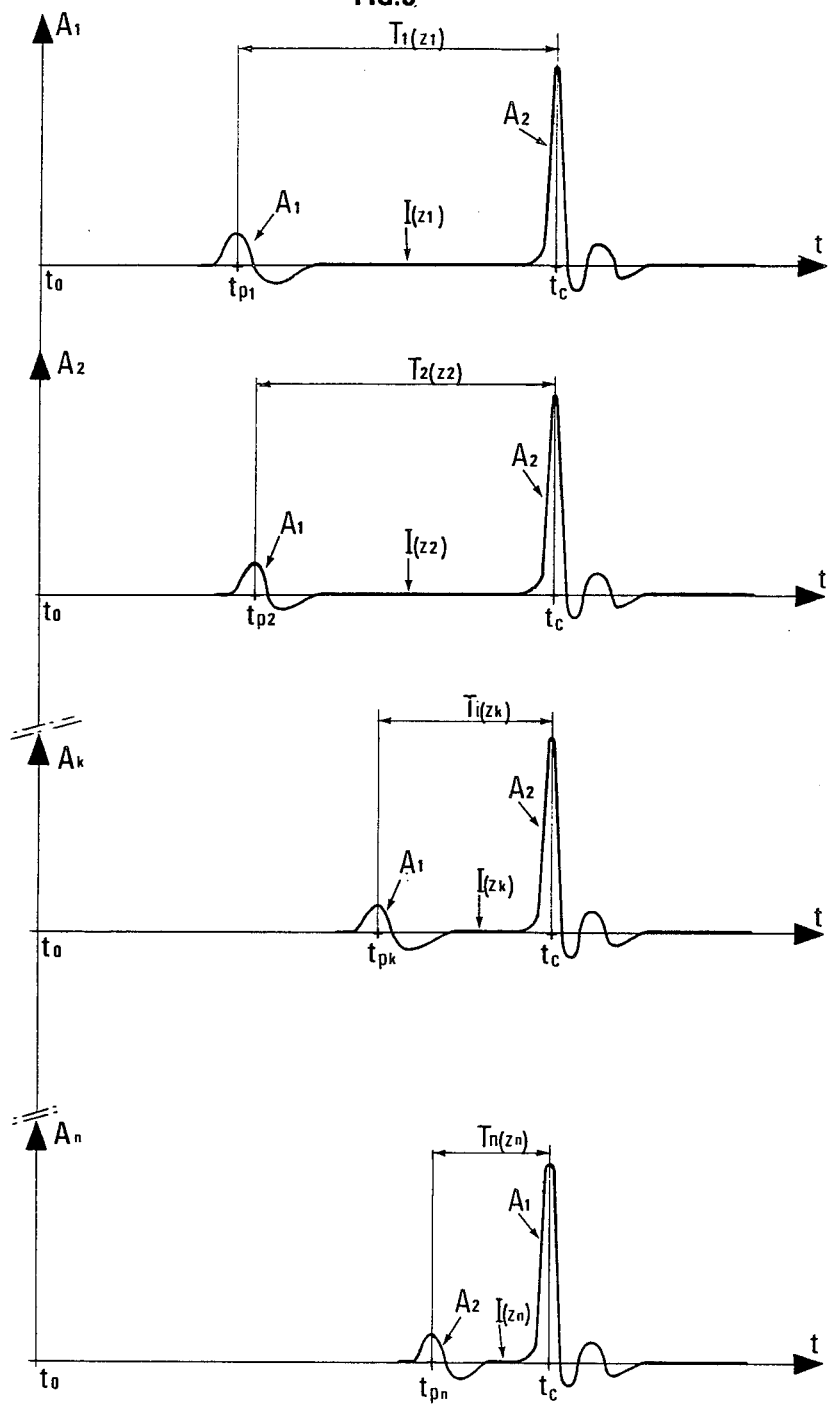

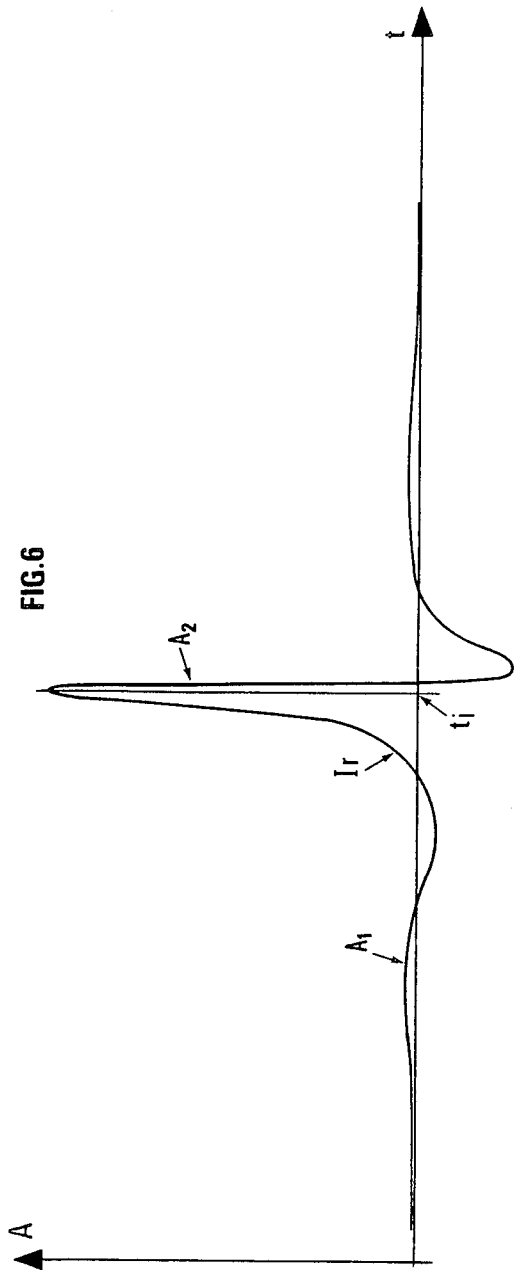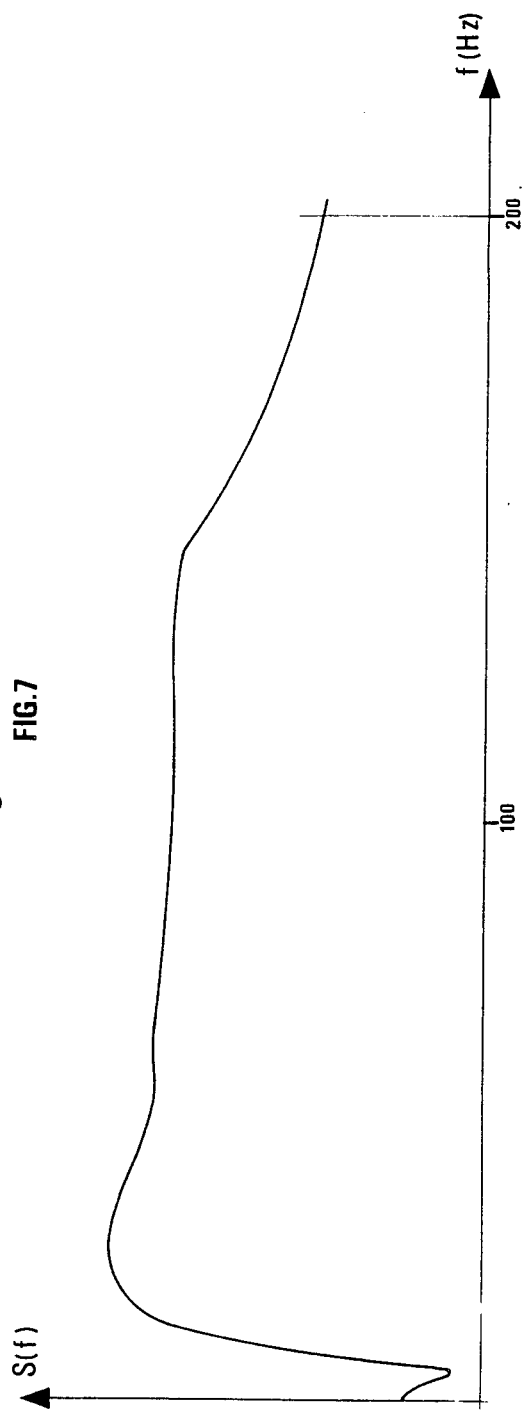

PROCESS FOR OPTIMIZING THE FREQUENCY SPECTRUM OF PULSES EMITTED BY AN EMISSION DEVICE COMPRISING SEVERAL SEISMIC IMPLOSION FORCES

BACKGROUND OF THE INVENTION

1. Field of the Invention

The invention relates to a process for optimizing the frequency spectrum of pulses emitted by an emission device formed by a plurality of seismic implosion sources.

Seismic pulses generated by implosion sources are generally obtained by the sudden contraction in a liquid medium of a cavity in which there is a very low pressure with respect to the hydrostatic pressure.

2. Description of the Prior Art

This cavity may be defined by the walls of an immersed enclosure of variable volume of the type described for example in French Pat. No. 1 583 737.

It may also be obtained by injecting into the water mass a certain amount of super heated water vapor or by cavitation caused by the high speed discharge in the water of a certain volume of pressurized liquid.

As will be seen during the description and with reference to FIG. 1, the pulse generated by an implosion source has a first so called precursor peak corresponding, depending on the cases, to an overpressure or to an underpressure with respect to the hydrostatic pressure and which occurs on triggering off the source. The triggering moment is for example that when the mechanical means are actuated which held the enclosure in a maximum volume position, and when this latter begins to contract, or else that when water or super heated vapor is ejected at high speed. The peak is followed by a second pressure peak corresponding to the implosion properly speaking, and whose amplitude is much greater than that of the first peak. The amplitude ratio is generally of the order of ten. The interval of time T separating the times when the two peaks occur is generally designated a pseudo-period.

The pulse generated by an implosion source is brief and thus its frequency spectrum is wide, which is very favorable for carrying out seismic prospection operation at sea.

However, it can be observed that the frequency spectrum of the pulses due to implosions is limited in the low frequency range and has a hollow centered on a frequency $f_c$ whose value is related to the pseudo-period T by the relationship:

$$f_c = (3/2T)$$

The value of the frequency $f_c$ is generally situated in the frequency band between 25 and 50 Hz.

The hollow in the frequency spectrum which is related to the existence of the precursor peak will be all the more pronounced the greater the ratio of the amplitude of this peak to the amplitude of the implosion peak. The existence of this hollow is very troublesome for using implosion for seismic prospection because the spectrum is reduced by a band of frequencies which are very useful for the quality of the recordings.

The process of the invention avoids the above mentioned disadvantages.

SUMMARY OF THE INVENTION

The invention comprises the immersion of implosion sources at different depths, determined so as to give them distinct pseudo-periods, determination of the effective pseudo-period of each of the sources as a function of the depth to which it is immersed, determination for each of them of the duration of propagation of the acoustic waves over the distance which separates the source from the surface of the water, determination as a function of the pseudo-periods and of these previously determined propagation times of the time lags by which the moments for triggering these sources must be separated, for phasing the implosion peaks of the different pulses emitted by said sources after propagation, and sequential tripping of the different sources while respecting the previously determined time lags.

Taking into account the determination of the time lags, the implosion peaks of all the sources are added to each other and the resulting pulse thus has a considerably reinforced implosion peak.

On the other hand, since the tripping peaks remain out of phase with respect to each other, because of the inequality of the pseudo-periods of the different pulses which are combined, there occurs an attenuation of the whole of the precursor peaks with respect to the single implosion peak, as has been checked experimentally. It can be observed that the desired result is obtained; the frequency spectrum of the resulting pulse is much more homogeneous, with levelling out of the hollow and an extension towards the low frequencies, all the more sensitive the higher the number of implosion sources used. This improvement in the quality of the spectrum is the consequence of the observed attenuation of the precursor peaks which means that the ratio of the amplitude of the implosion peak to that of the whole of the precursor peaks is greatly increased.

BRIEF DESCRIPTION OF THE DRAWINGS

Other features and advantages of the process will be clear from the following description of an embodiment given as non limitative example with reference to the accompanying drawings in which:

FIG. 5 shows the curves representative of the pulses emitted sequentially by the different sources of FIG. 3, suitably staggered in time so that their implosion peaks are all in phase at the same time $t_c$;

FIG. 6 shows schematically the curve representative of the resulting pulse obtained by combination of the pulses of FIG. 5; and FIG. 7 shows the modulus of the frequency spectrum of the resulting pulse shown in FIG. 6 on a scale comparable to that used for FIG. 2.

DESCRIPTION OF THE PREFERRED EMBODIMENT

Figure 1:
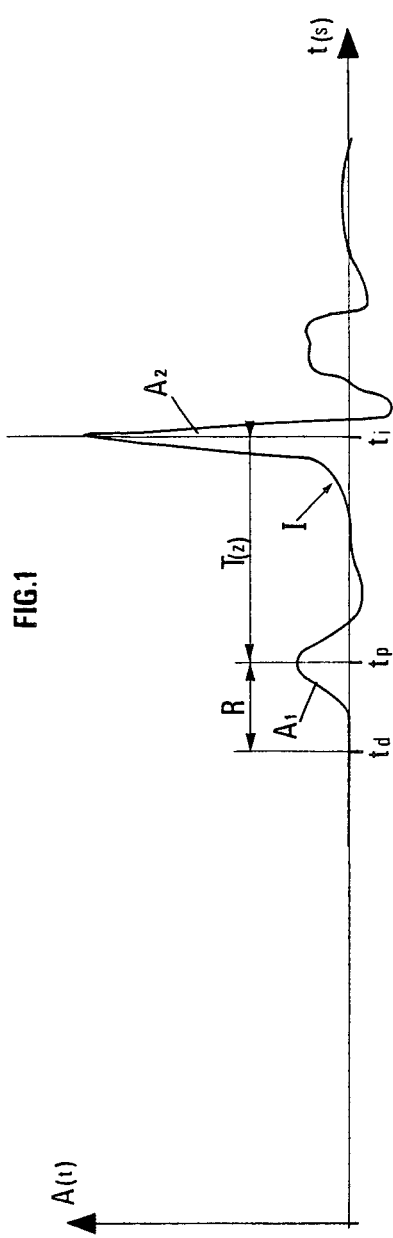
FIG. 1 shows schematically a curve representative of an acoustic pulse generated by an implosion source, obtained by measuring at a given distance the variations of the pressure generated by the source.

A seismic implosion source produces acoustic pulses I (FIG. 1) comprising a first so called precursor peak $A_1$ whose amplitude may be positive or negative. This peak occurs at a time $t_p$ subsequent to the tripping time $t_d$. The time lapse R between these two times which depends on the characteristics of the source used is known by previous measurement. The precursor peak is followed, after a time interval T called pseudo-period, by a second peak $A_2$, called implosion peak, centered on a time $t_i$, and whose positive amplitude is much greater than that of the first peak.

The ratio between the amplitudes of the second peak and of the first peak is often of the order of 10. The pseudo-period T varies as a function of the depth in accordance with Rayleigh's law:

$$T(z) = \alpha[p(z)]^{-5/6} \quad (1)$$

where p represents the hydrostatic pressure at a depth where the implosion source is immersed and $\alpha$ a coefficient of proportionality.

The times $t_d$ and $t_i$ of an implosion source immersed at depth z are related by the relationship:

$$t_i = t_d + R + T(z) \quad (2)$$

Figure 2:
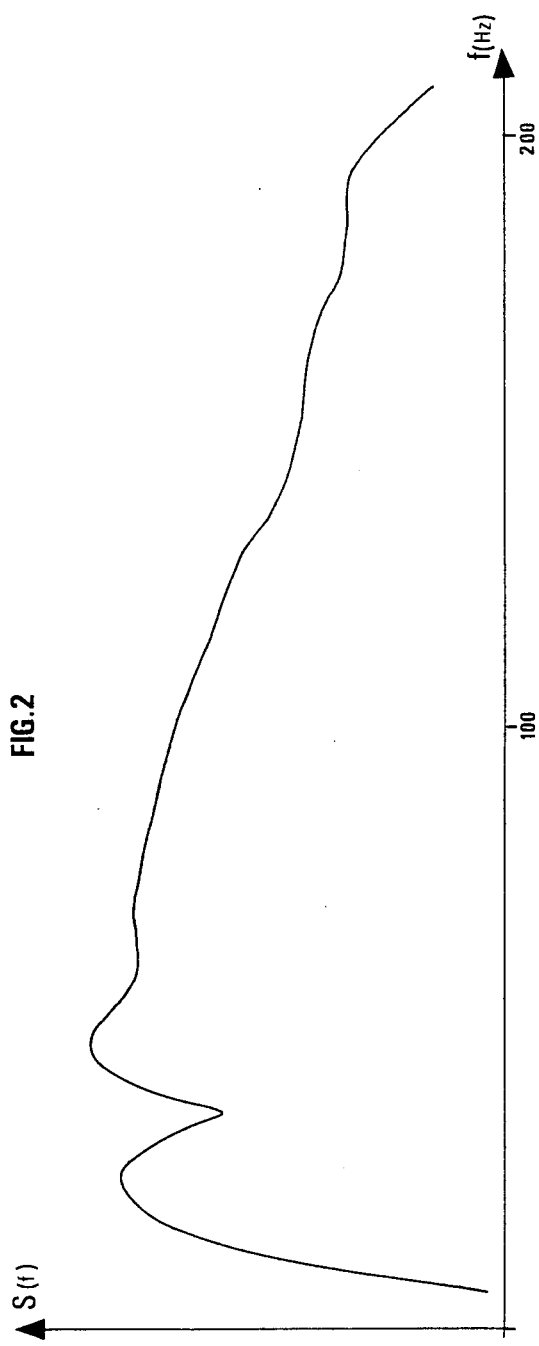
FIG. 2 shows the module of the frequency spectrum corresponding to the pulse shown in FIG. 1.
Figure 4:
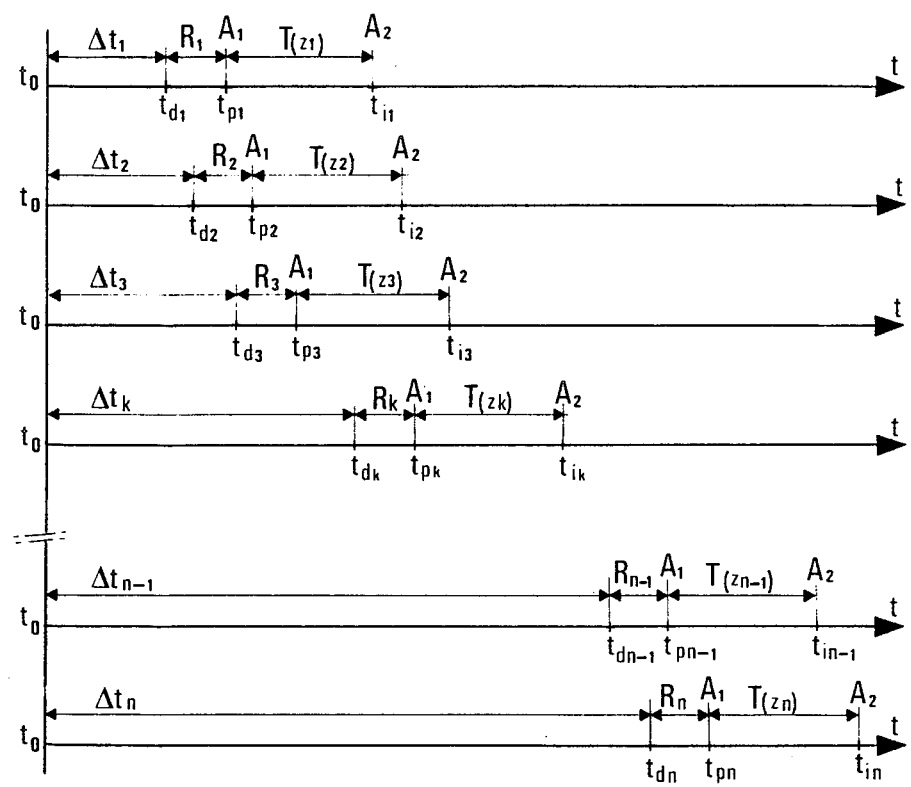
FIG. 4 shows schematically the chronological distribution, with respect to a common time origin $t_o$, of the times when the precursor peaks and the respective implosion peaks of all the sources of FIG. 3 occur.

The presence of the so called precursor peak results in modifying the frequency spectrum of the pulse which has (FIG. 2) a hollow in a frequency band very useful for seismic prospection.

Figure 3:
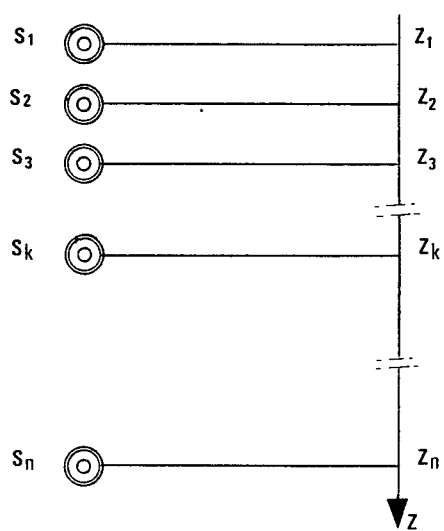
FIG. 3 shows schematically one example of a distribution of sources $S_1, S_2 \ldots S_k \ldots S_n$ immersed at different depths $z_1, z_2 \ldots z_k \ldots z_n$.

The process of the invention comprises first of all the immersion of a number of implosion sources $S_1, S_2 \ldots S_k \ldots S_n$ (FIG. 3) at different depths $z_1, z_2 \ldots z_k \ldots z_n$ respectively. The sources thus immersed are tripped so that their implosion peaks $A_2$ are combined in phase at the level of source $S_n$, the most deeply immersed source.

The chronology of firing is determined by taking as time origin the reference time $t_o$ when a source would be tripped if it were disposed on the surface. Such a source whose pseudo-period is T(o) and tripping delay is R(o), being tripped at time $t_o$, its implosion peak would occur at time:

$$t_o + R(o) + T(o)$$

The duration of propagation $u(z_1)$ of the acoustic waves between the surface and depth $z_1$ being equal to $Z_1/v$ (v is the speed of propagation of these waves), the implosion peak would reach the immersion depth of the first source $S_1$ at time:

$$t_o + R(o) + T(o) + u(z_1)$$

So that the implosion peak $A_2$ of the first source $S_1$ is produced at this time, this source must be tripped at the earlier time:

$$t_{d1} = t_o + R(o) + T(o) + u(z_1) - T(z_1) - R_1$$

$T(z_1)$ and $R_1$ designating respectively the pseudo-period and the tripping delay characteristic of source $S_1$.

Consequently, the time interval $\Delta t_1$ separating the tripping time $t_{d1}$ and the initial time $t_o$ which is expressed by the relationship:

$$\Delta t_1 = u(z_1) + T(o) - T(z_1) + R(o) - R_1$$

is equal to the propagation time of the waves from the surface to the depth $z_1$ to which is added the difference between the pseudo-period of the source at the depth $z_1$ and that of the fictive surface source, and the difference of the two delays R(o) and $R_1$.

Similarly, it may be established that, whatever $k = 2, 3 \ldots n$, the time interval $\Delta t_k$ separating the tripping time $t_{dk}$ of source $S_k$ immersed at depth $s_k$ from the initial time $t_o$ is expressed by a similar relationship:

$$\Delta t_k = u(z_k) + T(o) - T(z_k) + R(o) - R_k$$

depending on the duration of propagation of the waves to the depth $z_k$, on the difference between the pseudo-period of the source considered $S_k$ and that of the fictive surface source and on the difference between the two characteristic delays R(o) and $R_k$.

It can be seen in FIG. 5 that, when the pulses $I(z_1), I(z_2), \ldots I(z_k) \ldots I(z_n)$, emitted successively at depths $z_1, z_2, \ldots z_k \ldots z_n$ while respecting the time intervals $t_1 \ldots t_k \ldots t_n$ determined above, are propagated to the immersion depth of source $S_n$, their implosion peaks $A_2$ are all in phase at a time $t_c$ and consequently are added together. On the other hand, their respective precursor peaks $A_1$ are all out of phase with respect to each other because of the inequality of the pseudo-periods $T(z_1), T(z_2) \ldots T - z_k) \ldots T(z_n)$. The combination of all the pulses gives a resultant pulse $I_r$ whose implosion peak $A_2$ (FIG. 6) is considerably reinforced and whose precursor peak $A_1$ is minimized because of the time lags. The effect is all the more noticeable the higher the number n of implosive sources used.

The almost complete disappearance of the tripping peak of the resultant pulse $I_r$ allows a frequency spectrum to be obtained widened towards the low frequencies and more homogeneous, to the extent that the hollows related to the existence of the tripping peaks and to their relatively large amplitude with respect to that of the implosion peaks, are almost completely levelled out (FIG. 7).

With the different implosion sources immersed at chosen depths, they are tripped in sequence while utilizing the predetermined time intervals allowing the desired phasing.

Implementation may be obtained by utilizing at each "firing" the same time intervals determined beforehand, but preferably adjustments may be made for taking into account more precisely the real immersion depth of each source in direct application of Rayleigh's law. These adjustments may be carried out for example in real time, by measuring continually, by means of sensors, the respective immersion depths of all the sources.

Still within the scope of the invention, groups of several implosion sources may be disposed at several different immersion depths and all the sources of the same group tripped with an identical delay corresponding to their immersion depth.

Still within the scope of the invention, the time intervals predetermined in accordance with the method described above may be modified so as to slant the acoustic wave front obtained in a desired direction, with respect to the vertical direction.

What is claimed is:

1. A process for optimizing the frequency spectrum of the pulses emitted by an emission device formed by a plurality of seismic implosion sources and resulting from the combination of the individual pulses emitted by said implosion sources, each of said individual pulses comprising a precursion peak followed by an implosion peak, delayed by a pseudo-period with respect to the precursion peak, which precursion peak occurs a time lapse after tripping of the implosion source, said process comprising:

immersing the implosion sources at different selected depths, so as to give them distinct pseudo-periods;

determining the effective pseudo-period of each of the sources as a function of the selected depth to which the sources is immersed;

determining, for each of the sources, the propagation time interval of acoustic waves over the distance from a water surface to said source;

determining, as a function of said pseudo-period and of said respective propagation time intervals, and of said respective time lapse, time lags which should separate the tripping times of the sources for phasing the implosion peaks of the different pulses emitted after propagation, while keeping out of phase the precursion peaks of the different implosion sources, and sequentially tripping said sources while utilizing the previously determined time lags, whereby the ratio of the amplitude of the resulting implosion peak to that of the whole of the precursion peaks is increased providing for an improved frequency spectrum.

2. The process as set forth in claim 1, wherein measurement of the pseudo-periods of the different sources is performed before each sequential tripping, by measuring their real immersion depth.

3. The process as set forth in claim 1, wherein one or more implosion sources are disposed at each immersion depth chosen, the implosion sources disposed at the same depth being tripped with an identical time lag.

* * * * *